Figure 3:
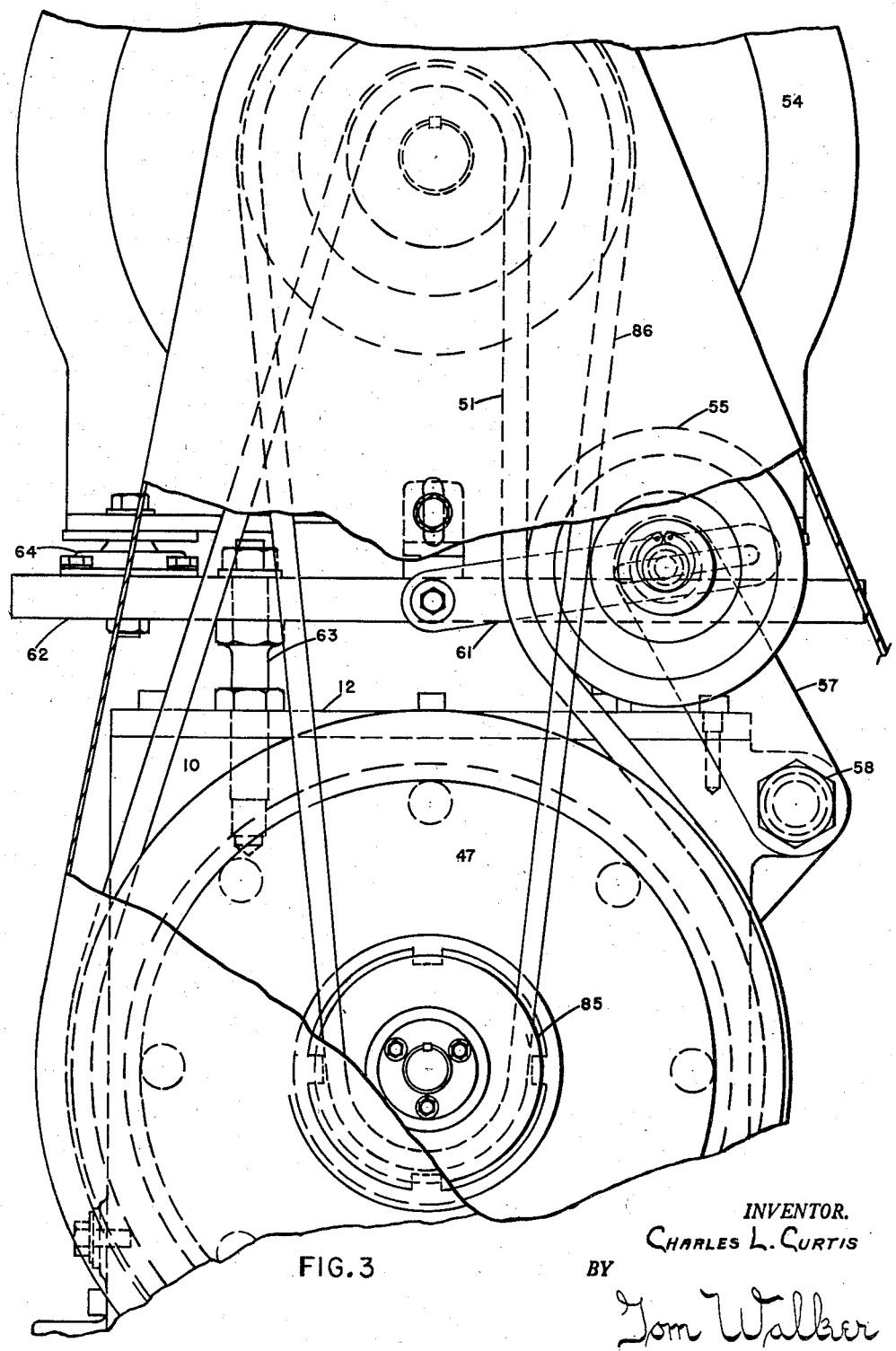

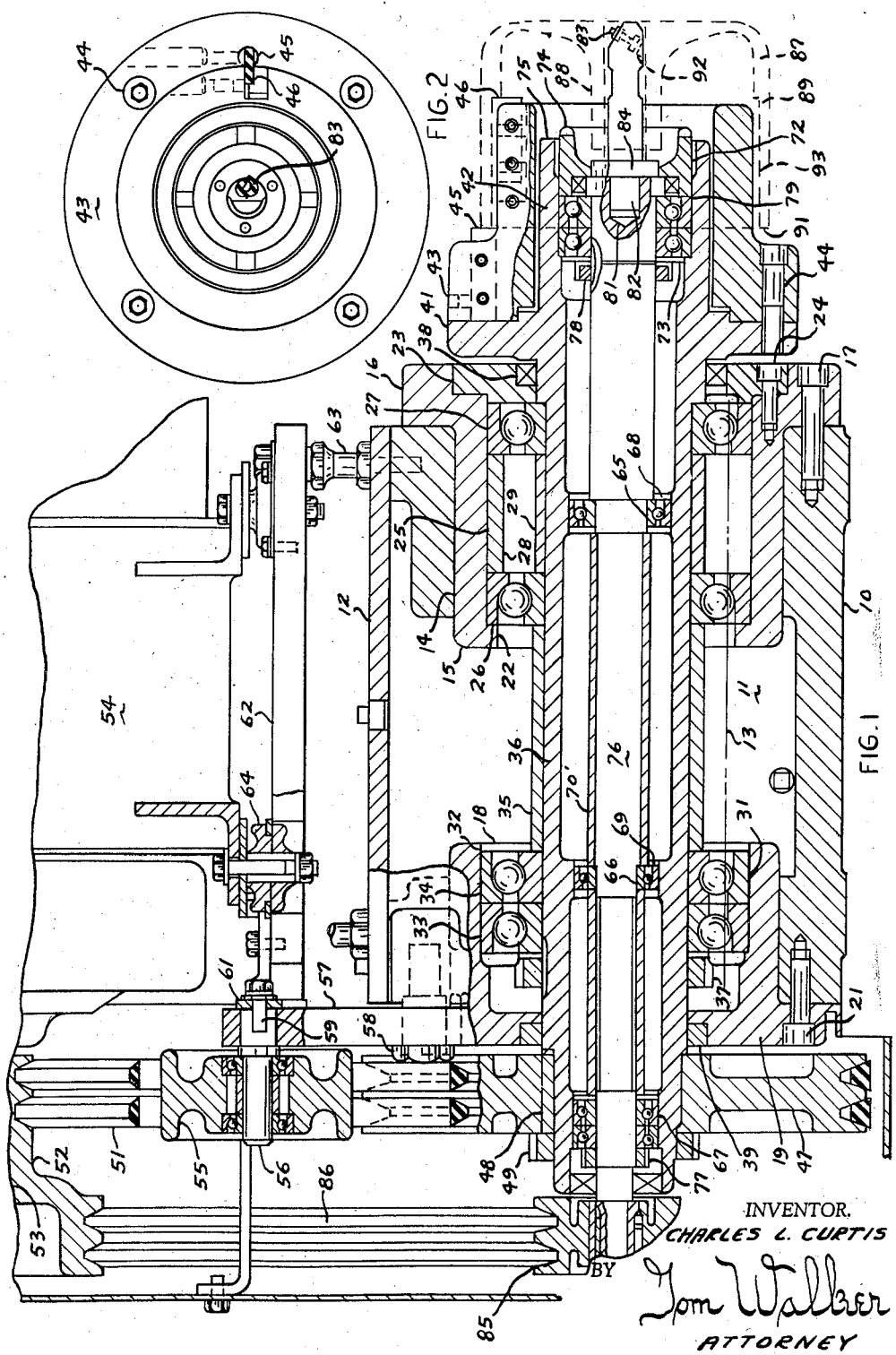

2,838,962
Patented June 17, 1958

2,838,962

MACHINE TOOL

Charles L. Curtis, Sidney, Ohio, assignor to Curtis Corporation, Dayton, Ohio, a corporation of Ohio Application August 25, 1953, Serial No. 376,487

3 Claims. (Cl. 77—3)

This invention relates to machine tools and particularly to boring and like tools.

An object of the invention is to bore a work piece and to effect counterboring or facing, or both, of the work piece as a part of the same operation, thus assuring uniform results and obviating multiple machines and multiple set-up time.

Another object of the invention is to achieve a relatively high degree of concentricity in boring and counterboring work by defining a fixed, concentric relation of the boring and counterboring tools.

A further object of the invention is to present a generally new machine tool providing in integrated form tools for performing concomitantly machining operations heretofore accomplished separately and on different machines.

Still another object of the invention is to make use of a generally new principle in machine tools, involving concentric, relatively rotatable spindles permitting the carrying out of concentric boring and like work in a single machining operation.

A further object of the invention is to provide a machine tool which may be used for simultaneous removal of material from different diameters or surfaces of a work piece at a rate of surface speed commensurate with the generally accepted cutting speeds for each diameter or surface independent of the others.

With the above primary and other incidental objects in view as will more fully appear in the specification, the invention intended to be protected by Letters Patent consists of the features of construction, the parts and combinations thereof and the mode of operation, as hereinafter described or illustrated in the accompanying drawings, or their equivalents.

In the drawings, wherein is illustrated one but obviously not necessarily the only form of embodiment of the invention, Fig. 1 is a view in longitudinal section of a boring tool in accordance with the illustrative embodiment of the invention;

Fig. 2 is a view in front end elevation of the work engaging end of the tool of Fig. 1; and Fig. 3 is a view in rear or opposite end elevation, partly broken away to show the driving connections from the motor to the tool spindles.

Like parts are indicated by similar characters of reference throughout the several views.

Referring to the drawing, a machine tool in accordance with the illustrative embodiment of the invention comprises a body member 10 adapted to rest on a suitable pedestal or machine mount. A chamber 11 is formed in the body 10 and opens through the upper surface of the body, the opening so defined being closed by a plate 12. As indicated by the level line 13, the chamber 11 holds a quantity of oil for the lubrication of bearings, to be described.

The body member 10 is traversed by a through, longitudinal bore 14, intersecting the chamber 11. At its one end the bore 14 receives a bushing 15 having a flange 16 seating on the adjacent end of the body 10. Bolts 17 hold the bushing 15 rigidly installed in the body 10. At its opposite end the bore 14 receives a cylindrical sleeve 18 formed integrally with a closure plate 19 which abuts the adjacent end of the body 10 and is secured thereto by bolts 21.

The inner end of the bushing 15 is formed with an inturned lip 22 in opposing, spaced apart relation to a keeper 23 abutting the opposite or outer end of bushing 15 and secured thereto by bolts 24. Disposed between the lip 22 and the keeper 23 is a bearing assembly 25 comprising individual bearing units 26 and 27 and intermediate spacer sleeves 28 and 29.

The sleeve 18 of closure plate 19 is formed with a counterbore 31 receiving a bearing assembly 32 comprising side-by-side individual roller bearing units 33 and 34. A spacer sleeve 35, interposed between the bearing assemblies 26 and 32 holds the units 33 and 34 in place in the counterbore 31.

Supported in and by the bearings 26 and 32, and positioned thereby in concentric relation to the bore 14, is a hollow spindle 36 extending at its either end through and beyond the keeper 23 and plate 19, respectively. A lock nut 37 on the spindle 36 provides a seat in counterbore 31 for the bearing assembly 32. Sealing devices 38 and 39 are installed in the keeper 23 and plate 19, respectively, to prevent the escape of lubricating oil along the bearing assemblies.

The one projecting end of the spindle 36 is formed with a radial flange 41 and a projecting cylindrical portion 42 providing a support for a selected tool mount, as, for example, a complementary shaped chuck 43 slipped over portion 42 and attached to the flange 41 by bolts 44. The base or flanged end of the chuck 43 mounts one or more work performing elements, as a facing tool 45, the working end of which extends in parallel relation to the projecting cylindrical portion of the chuck. At the opposite or outer end of such latter portion, the chuck mounts another work performing element, as a counterboring tool 46.

The other or opposite projecting end of the spindle 36 has a pulley 47 mounted thereon, connected to the spindle for unison rotary motion by a key 48 and held against axial displacement by a nut 49. By vtriue of appropriate belts 51, the pulley 47 has a driven connection with a sheave 52 keyed to the shaft 53 of an electric rotary motor 54. In response to operation of the motor 54, therefore, the spindle 36 is driven rotatably in the bearings 26 and 32, there being an appropriate ratio between the speed of rotation of the motor shaft 53 and the speed of rotation of the spindle 36, determined by the relative diameters of the pulley 47 and the sheave 52. Tension in the belts 51 is controlled by an idler pulley 55 rotatably mounted on a stub shaft 56 mounted on one end of an arm 57, the other end of which is pivotally connected by a bolt 58 to the body 10. A screw stud 59 is received in one end of the shaft 56, after passing through a slot in a link 61, the arm 57 and link 61 in effect comprising an adjustable toggle connection which can be fixed in a selected position of adjustment by tightening the stud 59 down upon link 61.

The link 61 is pivotally connected to a plate 62 which is held in parallel, spaced relation to the top closure plate 12 by post assemblies 63. The plate 62 further serves as a base plate for the electric motor 54, the motor being mounted thereon by means of resilient connector devices 64.

The hollow interior of the spindle 36 is formed with annular lands 65, 66 and 67 mounting roller bearing assemblies 68, 69 and 71, respectively. Further, the interior of the cylindrical extension 42 of the spindle is formed with a counterbore 72 seating a bearing assembly 73. A keeper 74, held in place by a radial set screw 75 confines the bearing assembly 73 in the counterbore 72. Spacer sleeves 70 and 70' hold the bearing assemblies 68 and 69 and the bearing assemblies 69 and 71, respectively, in position on their respective lands 65, 66 and 67.

Mounted in the bearing assemblies 68, 69, 71 and 73, concentrically of the first considered or outer spindle 36, is an inner spindle or shaft 76. Lock nuts 77 and 78 on the spindle 76 provide seats for the respective end bearing assemblies 71 and 73. At its one end the spindle 76 terminates within the cylindrical extension 42 of the outer spindle 36, although extending through the bearing assembly 73 and being formed with an enlarged head 79 having thrust engagement with such bearing assembly. An axial recess 81 in the described end of the spindle 76 provides for installation of a work performing element, as for example a tool shank 82 having a replaceable boring tool 83 in its outer end. A flange 84 on the shank 81 seats on the spindle head 79.

The other or opposite end of the spindle 76 extends through and beyond the corresponding end of the spindle 36. The projecting end thereof has a pulley wheel 85 made fast thereto and driven by belts 86 extending from the aforementioned sheave 52. Through the sheave 52, belts 86 and pulley wheel 85, therefore, the spindle 76 is rotated in the bearings 68, 69, 71 and 73 in response to operation of the electric motor 54. Thus, operation of the electric motor serves to rotate the spindles 36 and 76 simultaneously, and, as will be understood from the varying diameter of the sheave 52 and of the pulleys 47 and 85, at relatively different speeds.

While the principle of inner and outer rotating spindles may have various applications in machine tools, in the illustrated embodiment of the invention the construction and arrangement of parts is one for carrying out boring, counterboring and facing of a work piece such as the one shown in broken lines at 87 as being acted on by the work performing elements 45, 46 and 83. Thus the piece 87 has a center horn 88 to be bored, an outer cylindrical wall 89 to be counterbored and an end surface 91 to be faced. Mounting the piece 87 in any conventional manner and causing it to advance on the instant machine, the described operations, which heretofore have required an application of the work to separate machines with multiple set-up time, are accomplished in what is in effect a single machining operation. Thus, as the horn 88 reaches cooperative relation with the tool 83, a bore 92 is cut out in response to continued relative axial movement of the work piece. Similarly, the element 46 cuts a counterbore 93 in the wall 89, and, near the end of the machining operation, the element 45 engages and faces the surface 91. In addition to effecting three operations in one, with its resultant conservation of time and machinery, it will be understood that the present machining process provides a consistent, predictable relationship between the bore 92, counterbore 93 and the surface 91. The several work performing elements are in fixed, concentric relation, insuring that the bore 92 and counterbore 93 are likewise concentric, with the surface 91 perpendicular thereto, and further insuring that each work piece 87 will correspond in its dimensions to every other piece produced on the same machine.

The axial thrust exerted on the spindle 76 is transmitted through the head 79 and bearing assembly 73 to the outer spindle 36. Thrust on the spindle 36 is sustained by the body 10 through the bearing assembly 25, bushing 15 and flange 16, it being noted in this connection that the spindle 36 is formed with an annular shoulder 94 in abutting relation to the unit 26 of the bearing assembly 25.

The bearing assemblies 26—27, 33—34 and 71—73 are all preloaded through cooperation of their respective spacer sleeves and lock nuts. Such preloading of the bearings insures true running and quiver or chatter free spindles. The bearings 68 and 69 are stabilizing bearings and are used to prevent shaft whip which otherwise might occur due to the speed at which shaft 76 normally rotates. The bearings are also of the packed or lubricated type, the lubricant being of a type which will withstand high temperature and high speed operation.

The tool mounts 43 and 82 are replaceable by mounts of other types adapted for mounting on the respective shafts 36—76. The particular design of such mounts will vary depending upon the particular machining operation to be performed. Such operations might, for example, include in addition to those already mentioned, chamfering, milling, grinding, grooving, chasing, undercutting and necking.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect.

Having thus described my invention, I claim:

1. A machine tool, including a body having an internal chamber containing a lubricant, a through bore in said body intersecting said chamber, open ended bushings installed in said bore at opposite ends thereof, rolling bearings mounted in said bushings, a hollow spindle mounted in said bearings and extending through and beyond the ends of said bushings, spaced apart rolling bearings in said spindle, shaft means rotatably mounted in said last named bearings and extending at its opposite ends substantially through and beyond said spindle, means for rotating said spindle and said shaft means at corresponding ends thereof, and work tools on the opposite corresponding ends thereof.

2. A machine tool, including a body, a through bore in said body, telescoping work spindles relatively rotatably mounted in said body and extending through and beyond the ends thereof, a motor mounting plate supported on said body, a motor on said plate, a shaft rotatable by said motor and in parallel relation to said spindles, individual belt and pulley connections between said shaft and corresponding ends of said spindles, toggle links between said base plate and said body, belt tensioning means supported by said links, and a chamber in said body intersected by said through bore and containing a fluid lubricant.

3. A machine tool, including a support, longitudinally spaced bearings at each end of the support, a fluid lubricant chamber formed in said support intermediate said bearings, a hollow spindle rotatably mounted in said bearings and having each end extending beyond the bearing and projecting through and beyond the ends of said support, a work performing element on one projecting end of said hollow spindle describing a circular path in response to rotation of said hollow spindle, a rotary driving member on the other projecting end of said hollow spindle, a second series of longitudinally spaced bearings in said hollow spindle, some of said second series bearings being mounted between said bearings supporting said hollow spindle and others being mounted adjacent the ends of said hollow spindle, a second spindle rotatably mounted in said second series bearings, one end of said second spindle being located in adjacent concentric relation to the said one projecting end of said hollow spindle and the other end of said second spindle extending through and beyond the said other projecting end of said hollow spindle, a detachable work performing element on one end of said second spindle describing a circular path in response to rotation of said spindle concentric to the circular path of said first work performing element and a second rotary driving member on the said other end of said second spindle.

References Cited in the file of this patent

UNITED STATES PATENTS

| | | |
|---|---|---|
| 53,896 | Stewart | Apr. 10, 1866 |
| 598,658 | Gilman | Feb. 8, 1898 |
| 1,723,999 | Bernard | Aug. 13, 1929 |
| 1,940,220 | McGrath | Dec. 19, 1933 |
| 2,250,670 | Joy | July 29, 1941 |